US005618593A

United States Patent [19]
Belser et al.

[11] Patent Number: 5,618,593
[45] Date of Patent: Apr. 8, 1997

[54] WEATHERSTRIP MOLDING AND METHOD OF MAKING SAME

[75] Inventors: John W. Belser, Northville; Willard C. Christian, Lambertville, both of Mich.

[73] Assignee: The Standard Products Company, Cleveland, Ohio

[21] Appl. No.: 697,073

[22] Filed: May 8, 1991

[51] Int. Cl.⁶ .................................................. B60R 13/04
[52] U.S. Cl. .......................... 428/31; 49/441; 49/490.1; 428/121; 428/122; 428/358; 428/421; 428/516; 428/520
[58] Field of Search ..................... 428/31, 121, 122, 428/358, 520, 516, 421; 49/441, 490, 491

[56] References Cited

U.S. PATENT DOCUMENTS

| | | | |
|---|---|---|---|
| 3,638,359 | 2/1972 | Kruschwitz | 49/490 |
| 3,825,459 | 7/1974 | Taylor | 156/244 |
| 3,922,460 | 11/1975 | Jackson | 428/217 |
| 4,042,741 | 8/1977 | Bright | 428/217 |
| 4,052,497 | 10/1977 | Monnet | 264/255 |
| 4,092,813 | 6/1978 | Eggert | 52/397 |
| 4,119,325 | 10/1978 | Oakley et al. | 277/207 R |
| 4,130,535 | 12/1978 | Coran et al. | 524/487 |
| 4,214,036 | 7/1980 | Bright | 428/358 |
| 4,259,812 | 4/1981 | Adell | 49/462 |
| 4,268,552 | 5/1981 | Duvdevani et al. | 428/31 |
| 4,308,302 | 12/1981 | Etter et al. | 428/83 |
| 4,318,249 | 3/1982 | Landreth | 49/490 |
| 4,328,273 | 5/1982 | Yackiw | 428/122 |
| 4,358,482 | 11/1982 | Jubelt | 427/259 |
| 4,371,583 | 2/1983 | Nelson | 428/358 |
| 4,381,273 | 4/1983 | Azzola | 264/45.9 |
| 4,411,938 | 10/1983 | Madonia et al. | 428/31 |
| 4,411,941 | 10/1983 | Azzola | 428/122 |
| 4,419,844 | 12/1983 | Kreisfeld | 49/475 |
| 4,434,598 | 3/1984 | Adell | 52/716 |
| 4,438,162 | 3/1984 | Nelson | 427/318 |
| 4,472,469 | 9/1984 | Thies | 428/122 |
| 4,495,234 | 1/1985 | Tominaga et al. | 428/122 |
| 4,513,044 | 4/1985 | Shigeki et al. | 428/122 |
| 4,576,773 | 3/1986 | Azzola et al. | 264/167 |
| 4,603,899 | 8/1986 | Iwasa | 296/154 |
| 4,617,220 | 10/1986 | Ginster | 428/122 |
| 4,619,077 | 10/1986 | Azzola et al. | 49/497 |
| 4,634,735 | 1/1987 | Thiersault et al. | 525/88 |
| 4,654,239 | 3/1987 | Sancovsky | 428/31 |
| 4,654,257 | 3/1987 | Murachi | 428/317.1 |
| 4,654,262 | 3/1987 | Alonso | 428/345 |
| 4,701,376 | 10/1987 | Hermann et al. | 428/358 |
| 4,708,351 | 11/1987 | Midooka et al. | 277/184 |
| 4,765,936 | 8/1988 | Ballocca | 264/46.1 |
| 4,778,550 | 10/1988 | Barton et al. | 156/211 |
| 4,780,345 | 10/1988 | Gray | 428/35 |
| 4,783,931 | 11/1988 | Kirkwood | 49/441 |
| 4,810,540 | 3/1989 | Ellison et al. | 428/31 |
| 4,931,324 | 6/1990 | Ellison | 428/40 |
| 4,937,126 | 6/1990 | Jackson | 428/31 |
| 4,975,306 | 12/1990 | Jackson | 428/31 |
| 5,018,308 | 5/1991 | Vaughan | 428/122 |

FOREIGN PATENT DOCUMENTS

| | | |
|---|---|---|
| 4714844 | 5/1972 | Japan . |
| 1012759 | 12/1965 | United Kingdom . |
| 1522634 | 8/1978 | United Kingdom . |

*Primary Examiner*—Nasser Ahmad
*Attorney, Agent, or Firm*—Harness, Dickey & Pierce, P.L.C.

[57] ABSTRACT

An improved weatherstrip molding or trim strip includes a dual durometer, coextruded molding body, with a laminated decorative film strip bonded to the harder durometer portion of the molding body in order to provide improved resistance to physical damage and environmental conditions for the film strip. The film strip offers the capability of providing a color-matched or color-coordinated appearance for a vehicle body, as well as a wide variety of gloss levels.

11 Claims, 2 Drawing Sheets

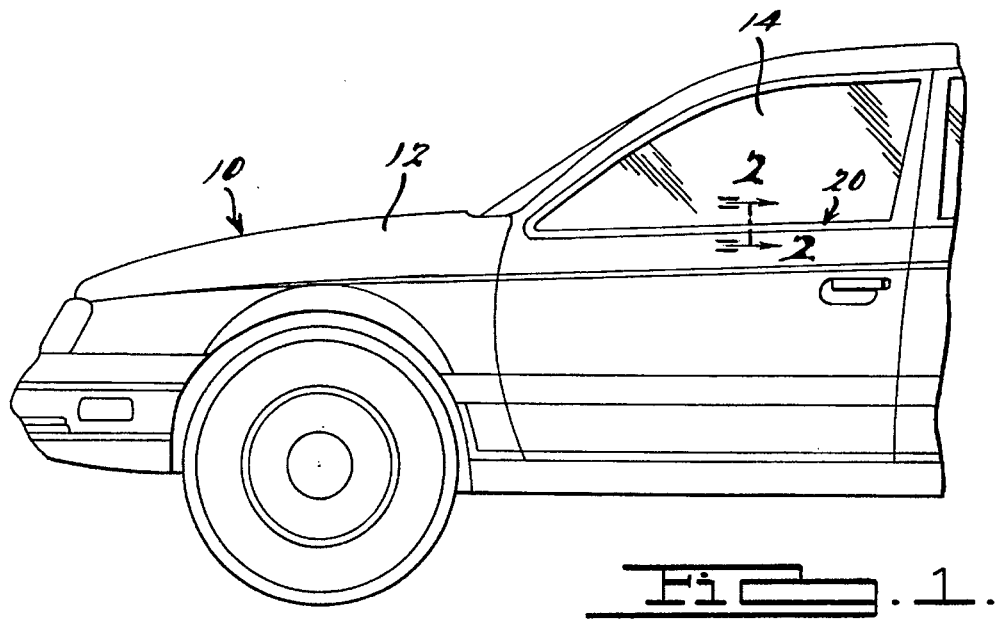
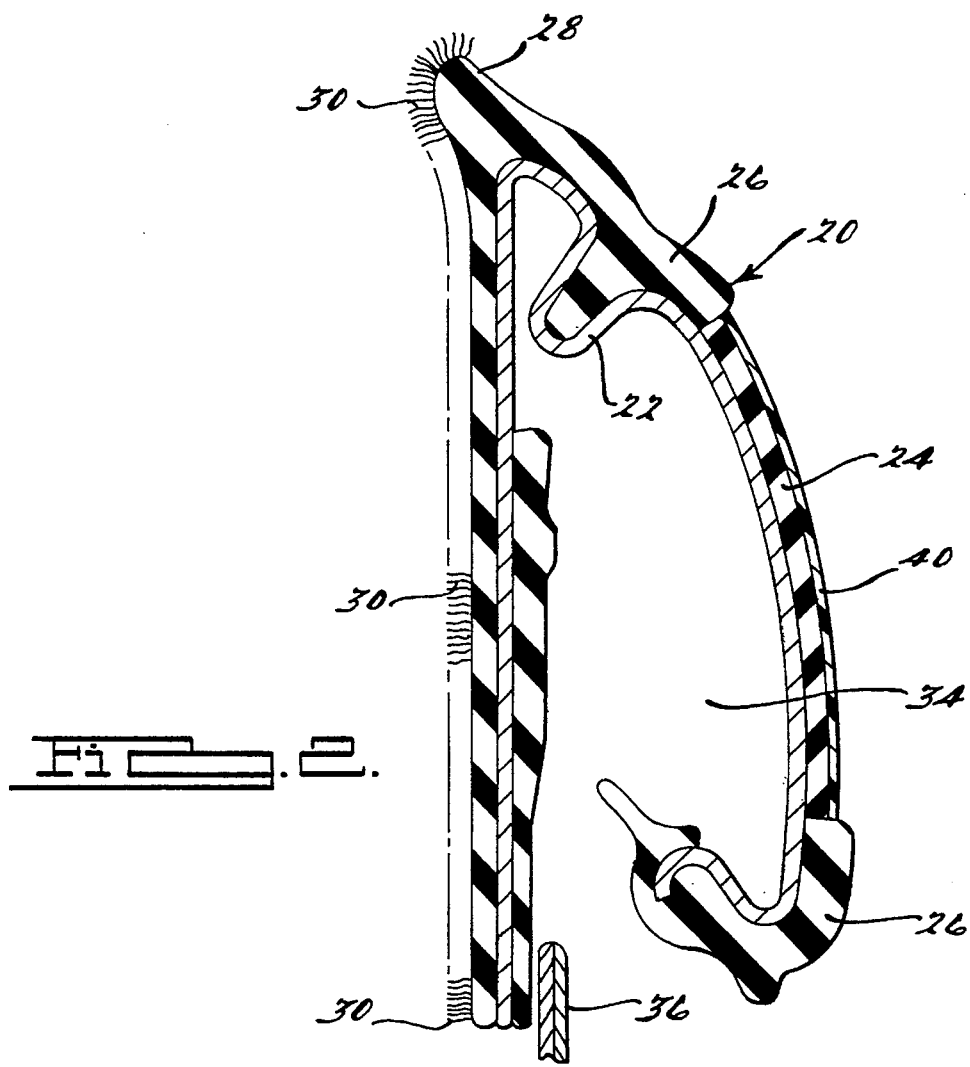

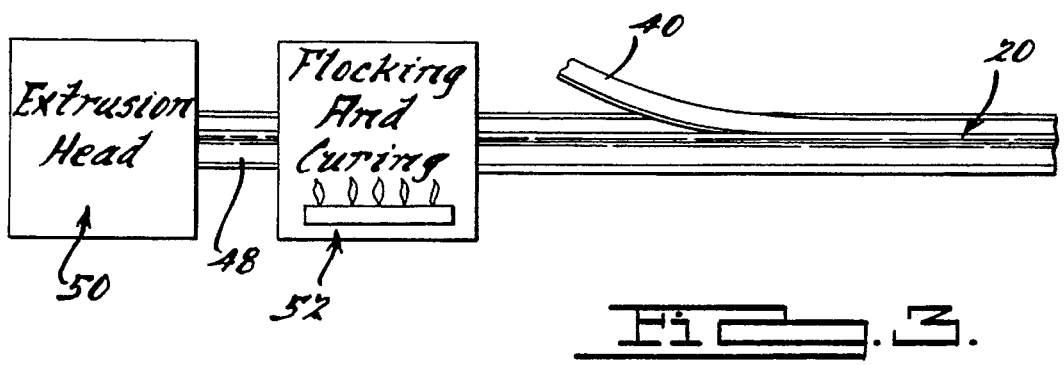
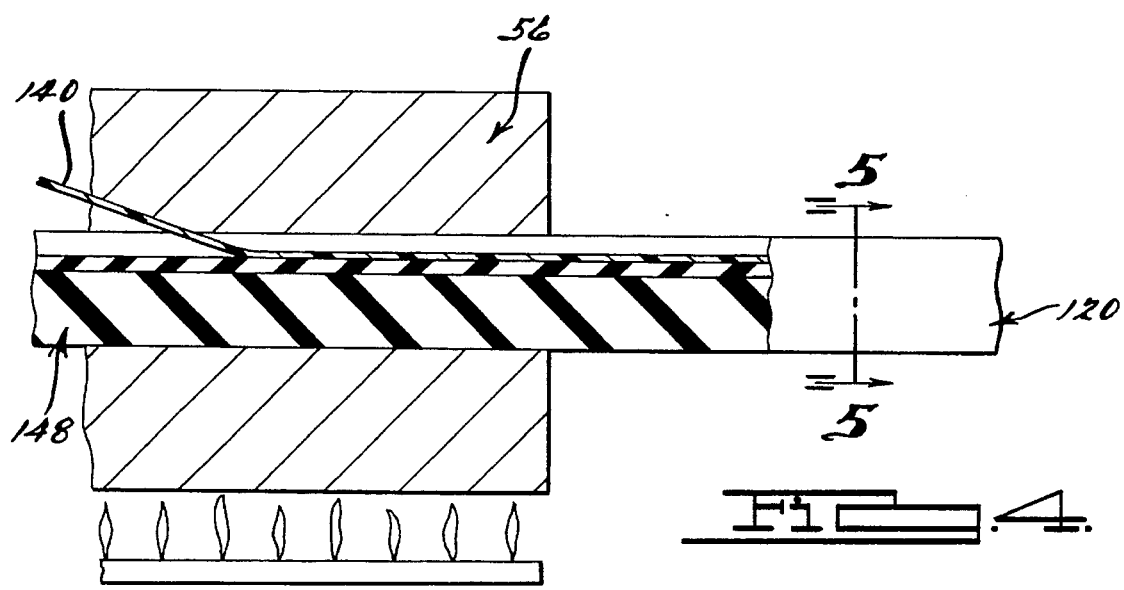
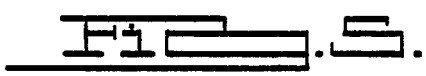
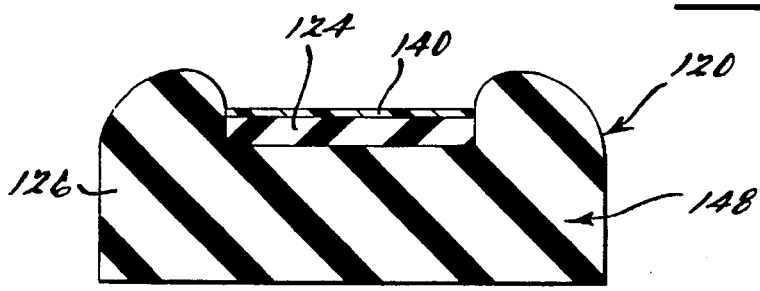

WEATHERSTRIP MOLDING AND METHOD OF MAKING SAME

BACKGROUND AND SUMMARY OF THE INVENTION

The present invention relates generally to weatherstrip moldings for attachment to an automotive vehicle. More particularly, the present invention relates to a weatherstrip molding having a durable, color-matched portion of the molding that can be matched to the vehicle's color scheme, as well as having a predetermined level of gloss.

Weatherstrip moldings are well known on automotive vehicle bodies, and are typically composed of synthetic elastomeric materials due to various desired physical properties of such materials. Such materials, however, are generally black in color, and may not possess the desired level of glossiness compatible with styling considerations required for the vehicle.

Various arrangements to match or coordinate the colors of weatherstrip moldings, or portions thereof, with the vehicle color scheme, as well as attempts to also achieve desired gloss levels have been provided in the prior art. One example of such previous arrangements is disclosed in U.S. Pat. No. 4,975,306, issued Dec. 4, 1990, and owned by the said assignee as the assignee of the present invention, the disclosure of which is incorporated by reference herein. Although some of such previous arrangements have performed rather well, the need has arisen for even further improved performance characteristics, such as improved weather and physical damage resistance, improved resistance to the effects of ultraviolet rays, salt-and-water solutions, oxidation, and other environmental conditions encountered by an automotive vehicle.

Accordingly, the present invention seeks to provide an improved weatherstrip molding having a dual durometer EPDM rubber molding body with a first portion having a durometer hardness greater than that of the remainder of the molding body, and a laminated film bonded onto the first portion of the molding body, with the laminated film including a layer of FLUOREX® and a layer of polypropylene. FLUOREX® is a registered trademark of the Rexham Corporation of Matthews, N.C. FLUOREX® is a weatherable polymeric product which comprises polyvinylidene fluoride as the major constituent. Preferably, especially in belt weatherstrips and glass run weatherstrip moldings, a metal reinforcing core is included, with the EPDM molding body being coextruded onto the core. In such applications, a second portion of the molding body has a flock material adhered thereto.

The preferred construction, with the first portion of the molding body having a durometer hardness of approximately 90 Shore A or greater, with the remainder of the molding body having a durometer hardness no greater than approximately 70 Shore A, and with the laminated film material bonded onto the first or harder portion of the molding body, offers improved characteristics in terms of better weatherability and damage resistance for the decorative laminated film, while still retaining the sealing capabilities of the remainder of the molding. In addition, because of the above-mentioned composition of the laminated film, superior results are obtained in terms of resistance to ultraviolet rays, salt solutions, oxidation, and other environmental conditions.

In a preferred method of making a weatherstrip molding according to the present invention, an EPDM rubber molding body is coextruded with a first portion having the greater hardness, as discussed above, then the coextruded molding body is heated in order to cure the molding body, and then the above-described laminated film is applied to the first portion of the molding body. Preferably, in certain applications, the dual durometer EPDM rubber molding body is coextruded onto the above-discussed metal reinforcing core, and the flock material is applied as discussed above prior to the heating and curing step.

Additional objects, advantages, and features of the present invention will become apparent from the following description and appended claims, taken in conjunction with the accompanying drawings.

BRIEF DESCRIPTION OF THE DRAWINGS

FIG. 1 is a partial elevational view of an exemplary weatherstrip molding applied to a vehicle body.

FIG. 2 is a cross-sectional view, taken generally along line 2—2 of FIG. 1, with the weatherstrip molding partially removed from a vehicle body flange.

FIG. 3 is a schematic illustration of the method of making the weatherstrip molding illustrated in FIGS. 1 and 3.

FIG. 4 is a partial schematic representation of the method of making an alternate embodiment of a weatherstrip molding according to the present invention.

FIG. 5 is a cross-sectional view taken generally along line 5—5 of FIG. 4.

DETAILED DESCRIPTION OF THE PREFERRED EMBODIMENTS

FIGS. 1 through 5 illustrate merely exemplary embodiments of a weatherstrip molding according to the present invention, as applied for weatherstrip moldings for automotive vehicle body applications. One skilled in the art will readily recognize from the following discussion, taken in conjunction with the accompanying claims, that the present invention is equally applicable to applications other than automotive vehicle bodies, as well as realizing that the present invention is also equally applicable to weatherstrip moldings of configurations other than those illustrated for purposes of illustration in the drawings.

FIG. 1 illustrates an exemplary, typical automotive vehicle 10 having a vehicle body assembly 12, with a movable glass panel 14 disposed in an opening therein. Although the present invention is equally applicable to other types of automotive vehicle body moldings, including decorative trim moldings, FIG. 1 illustrates an exemplary weatherstrip molding 20 according to the present invention, with the weatherstrip molding 20 adapted to serve as a belt weatherstrip adjacent to, and slidably engaging, the movable glass panel 14.

As illustrated in FIG. 2, the exemplary weatherstrip molding 20 preferably includes a preformed, metal reinforcing core 22, a first weatherstrip molding body portion 24, a second weatherstrip molding body portion 26, and a lip portion 28 having a flock material 30 thereon. The configuration of the exemplary weatherstrip molding 20 includes a generally U-shaped portion 34 adapted to receive and snugly engage a vehicle body flange 36 in order to retain the weatherstrip molding 20 in place. Preferably, the weatherstrip molding body is coextruded onto the metal reinforcing core 22, with the first molding body portion 24 having a durometer hardness greater than that of the remainder of the molding body portion. In preferred embodiments of the present invention, the first molding body portion 24 has a durometer hardness of at least approximately 90 Shore A, with the second molding body portion 26, including the lip portion 28, having a durometer hardness of no greater than approximately 70 Shore A.

In accordance with the present invention, a laminated film 40 is bonded or otherwise secured to the first, harder molding body portion 24, with the laminated film preferably having a layer of polyethylene terephthalate, a layer of FLUOREX®, and a layer of polypropylene. Such laminated film is commercially available from Rexham Decorative Products, of Matthews, N.C. This preferred film product includes a layer of FLUOREX® having a thickness of approximately 0.002 inch and a layer of polypropylene having a thickness of approximately 0.003 inch. As purchased the Rexham laminated film can also have a thin-layer carrier strip thereon, typically composed of polyethylene terephthalate, which is removed prior to applying the laminated film to the molding body.

This preferred laminated film material has superior characteristics in terms of weatherability, ultraviolet ray resistance, salt solution resistance, oxidation resistance, and resistance and durability in the face of other environmental conditions typically encountered by an automotive vehicle. It has been found, however, that these desired characteristics, as well as resistance to potential physical damage caused by scratches, physical impacts, and other physical conditions, are greatly improved by applying the laminated film material to a portion of the weatherstrip molding body having a durometer hardness of approximately 90 Shore A or harder, while the remainder of the weatherstrip molding body has a softer durometer hardness in order to retain its sealing and weather resistance capabilities. Thus, since such laminated film material can be produced with virtually any desired color or gloss level, the appearance of the weatherstrip molding according to the present invention is greatly enhanced, in terms of coordination with the vehicle body color scheme, without sacrificing performance of the weatherstrip molding in the face of environmental or physical conditions.

FIG. 3 schematically illustrates a method of making the weatherstrip molding 20, according to the present invention. As schematically illustrated in FIG. 3, with reference to FIG. 2, the metal reinforcing core 22 is roll-formed, or otherwise formed into its desired shape, and the above-described dual durometer EPDM rubber molding is coextruded onto the core 22 in a conventional coextrusion apparatus illustrated schematically at reference numeral 50. Next, in the exemplary embodiment depicted in the drawings, a flock adhesive is applied to the coextruded molding body, and the above-described flock material 30 is applied, with the flocked molding body being cured by heating in a curing oven, as is schematically represented at reference numeral 52.

While the weatherstrip molding body is still at an elevated temperature from the curing process, preferably generally of at least approximately 340° F., or preferably in the range of approximately 340° F. to 360° F., the laminated film 40 is guided and applied to the above-described first molding body portion 24. The application of the laminated film 40 to the first molding body portion 24 at such elevated temperatures causes the film 40 to be securely bonded to the weatherstrip molding body at the desired first molding body portion location 24, as can be seen in FIG. 2. The completed weatherstrip molding 20 is then cut to length as desired, trimmed as required for a given application, and end caps (not shown) are attached where required for a given installation. As mentioned above, the laminated film can have virtually any color for matching or coordinating with the vehicle body color, and can have any of a wide variety of gloss levels.

FIGS. 4 and 5 schematically illustrate a method of making an alternate weatherstrip molding according to the present invention. Such alternate weatherstrip molding 120 is actually configured to be a merely decorative automotive body trim strip, and thus does not require the above-described metal reinforcing core or flocking. The alternate weatherstrip molding 120 can be used in applications where the softer durometer portion of the trim strip is desired or necessary for flexibility or other design parameters, while the harder durometer portion offers the improved characteristics for the film strip discussed above. One skilled in the art will, of course, realize that other configurations and arrangements of weatherstrip or decorative moldings can be accomplished according to the present invention, with or without flocking, metal reinforcement cores, or the like.

As indicated generally at reference numeral 56, the molding body 148 is coextruded in a conventional manner, and the laminated film 140 is guided and applied to a predetermined first molding body portion 124, with the body portion 124 having a durometer hardness higher than that of the molding body portion 126. Thus, a decorative automotive trim strip 120 can be produced, using the advantageous method of the present invention, in order to provide a color-matched appearance, desired gloss level, and high durability and resistance to potential environmental and physical damage.

The foregoing discussion discloses and describes merely exemplary embodiments of the present invention for purposes of illustration only. One skilled in the art will readily recognize from such discussion, and from the accompanying drawings and claims, that various changes, modifications, and variations can be made therein without departing from the spirit and scope of the invention as defined in the following claims.

What is claimed is:

1. A weatherstrip molding comprising:
   an EPDM rubber molding body having a first portion having a durometer hardness greater than that of the remainder of said molding body; and
   a laminated film bonded onto said first portion of said molding body, said laminated film including a layer of polyvinylidene fluoride and a layer of polypropylene; wherein said laminated film has an outer surface of a predetermined color and a predetermined level of gloss.

2. A weatherstrip molding according to claim 1, further comprising a metal reinforcing core, said EPDM molding body being coextruded onto said core.

3. A weatherstrip molding according to claim 1, wherein said first portion if said molding body has a durometer hardness of at least 90 Shore A, said remainder of said molding body having a durometer hardness no greater than approximately 70 Shore A.

4. A weatherstrip molding according to claim 1, wherein said first portion of said molding body is an outer portion thereof, said laminated film being bonded to said first portion of said molding body so as to face outwardly relative to said weatherstrip molding.

5. A weatherstrip molding according to claim 1, wherein a second portion of said molding body has a flock material bonded thereto.

6. A weatherstrip molding according to claim 5 wherein a portion of said molding body has a generally U-shaped configuration, said U-shaped portion being adapted to receive a flanged portion of an automotive body generally adjacent a movable glass panel in order to retain said weatherstrip molding thereon, said second portion of said molding body being disposed to slidably engage said movable glass panel.

7. A weatherstrip molding according to claim 6, wherein said first portion of said molding body is an outer portion thereof, said laminated film being outwardly exposed when said weatherstrip molding is retained on said automotive body.

8. A weatherstrip molding comprising:

a metal reinforcing core;

an EPDM rubber molding body coextruded onto said core, said molding body having a first outer portion having a durometer hardness greater than that of the remainder of said molding body, said molding body having a second portion having a flock material bonded thereto; and a laminated film bonded onto said first portion of said molding body, said laminated film including a layer of polyvinylidene fluoride and a layer of polypropylene, said laminated film further having an outer surface of a predetermined color and a predetermined level of gloss.

9. A weatherstrip molding according to claim 8, wherein said first portion if said molding body has a durometer hardness of at least 90 Shore A, said remainder of said molding body having a durometer hardness no greater than approximately 70 Shore A.

10. A weatherstrip molding according to claim 9 wherein a portion of said molding body has a generally U-shaped configuration, said U-shaped portion being adapted to receive a flanged portion of an automotive body generally adjacent a movable glass panel in order to retain said weatherstrip molding thereon, said second portion of said molding body being disposed to slidably engage said movable glass panel.

11. A weatherstrip molding according to claim 10, wherein said first portion of said molding body is an outer portion thereof, said laminated film being outwardly exposed when said weatherstrip molding is retained on said automotive body.

* * * * *